United States Patent

Franklin et al.

[15] 3,701,983

[45] Oct. 31, 1972

[54] MAGNETOSTATICALLY COUPLED THIN-FILM MAGNETIC MEMORY DEVICES

[72] Inventors: Dennis M. Franklin, Randolph; Richard M. Hornreich, Sudbury; Harvey Rubinstein, Lynnfield, all of Mass.

[73] Assignee: Sylvania Electric Products, Inc.

[22] Filed: Dec. 19, 1969

[21] Appl. No.: 886,515

[52] U.S. Cl..340/174 QA, 340/174 NA, 340/174 PC

[51] Int. Cl. ..........................................G11c 11/14

[58] Field of Search..................340/174 QA, 174 PC

[56] References Cited

UNITED STATES PATENTS

| | | | |
|---|---|---|---|
| 3,524,173 | 8/1970 | Wolf | 340/174 |
| 3,154,840 | 11/1964 | Shahbender | 340/174 X |
| 3,161,946 | 12/1964 | Birkenbeil | 340/174 X |
| 3,330,631 | 7/1967 | Tsu | 340/174 X |
| 3,350,180 | 10/1967 | Croll | 340/174 X |
| 3,375,091 | 3/1968 | Feldtkeller | 340/174 X |
| 3,303,116 | 2/1967 | Maissel et al. | 340/174 X |
| 3,427,600 | 2/1969 | Middelhoek | 340/174 |
| 3,461,438 | 8/1969 | Chang et al. | 340/174 QA |
| 3,553,660 | 1/1971 | Wolf | 340/174 QA |

*Primary Examiner*—Stanley M. Urynowicz, Jr.
*Attorney*—Arthur C. Johnson et al.

[57] ABSTRACT

A multilayer magnetostatically coupled thin-film magnetic memory device comprising, in succession, a first magnetic film, a chromium-copper alloy conducting layer having a reasonably low resistivity, a smoothing layer, and a second magnetic film. Due to the presence of chromium in the chromium-copper alloy forming the conducting layer, when the second magnetic film is subsequently formed on the smoothing layer at an elevated temperature, the resulting grain growth and surface roughness of the chromium-copper alloy conducting layer are less severe than with other known metals having reasonably low resistivity values (e.g., copper, silver, gold, and aluminum) previously suggested for use as conducting layers in magnetostatically coupled thin-film magnetic memory devices. Consequently, the effects of grain growth and surface roughness of the chromium-copper alloy conducting layer on the static magnetic properties of the second magnetic film are less severe than heretofore, and a smaller combined thickness of the conducting layer and smoothing layer is required to make the values of the static magnetic properties of the first and second magnetic films nearly equal. As a further result of the smaller combined thickness of the conducting and smoothing layers made possible by the use of chromium in the chromium-copper alloy, an improved magnetostatic coupling between the two magnetic films is obtained.

An alternative multiplayer magnetostatically coupled thin-film magnetic memory device having no smoothing layer is also disclosed for use in less stringent applications where very close matching of the values of the static magnetic properties of the two magnetic films is not required.

20 Claims, 2 Drawing Figures

*INVENTORS*
DENNIS M. FRANKLIN
RICHARD M. HORNREICH
HARVEY RUBINSTEIN

MAGNETOSTATICALLY COUPLED THIN-FILM MAGNETIC MEMORY DEVICES

BACKGROUND OF THE INVENTION

The present invention relates to thin-film magnetic devices and, more particularly, to magnetostatically coupled thin-film magnetic memory devices.

Magnetostatically coupled thin-film magnetic memory devices, also commonly referred to as "coupled-film" or "closed-flux" devices, are well known to those skilled in the art. The advantages offered by magnetostatically coupled thin-film magnetic memory devices, namely, smaller memory cell or device size, greater signal amplitudes, and higher packing density, are also well known to those skilled in the art. A typical magnetostatically coupled thin-film magnetic memory device, as suggested by the prior art, includes a pair of magnetic films, for example, vacuum-deposited Permalloy or Cobalt-permalloy (ternary alloy) films, separated by vacuum-deposited conducting layer, for example, a write-sense conducting layer, having a reasonably low resistivity (high conductivity). Some materials having reasonably low resistivity values which have been suggested for use as conducting layers in magnetostatically coupled thin-film devices of the above type include copper, silver, gold, and aluminum.

As an improved variation of the three-layer device briefly described above, it has been suggested in the prior art to separate the two magnetic films by a conducting layer having a reasonably low resistivity, and a smoothing layer directly overlying the conducting layer of a material such as silicon monoxide, titanium, or molybdenum. The smoothing layer serves in known fashion to alleviate large-grain growth and surface roughness problems associated with the use of a conducting layer of pure copper, silver, gold, or aluminum by smoothing out the peaks and filling in the valleys of the top surface of the conducting layer thereby providing a reasonably smooth surface upon which the upper magnetic film can be deposited. As is well known, as a result of using a smoothing layer in conjunction with the conducting layer, the static magnetic properties of the upper magnetic film, such as wall-motion coercive force ($H_c$), angular dispersion ($\alpha_{90}$), and anisotropy field ($H_k$), are made to have reasonable, acceptable values for many storage applications, these values being more nearly equal to the values of the static magnetic properties of the bottom magnetic film.

Ideally, for most effective utilization, a magnetostatically coupled thin-film magnetic memory device should satisfy certain basic requirements. Among these basic requirements is that the upper and lower magnetic films have nearly equal values of static magnetic properties so that the films respond similarly when exposed to applied magnetic fields and, at the same time, not adversely affect adjacent devices. Additionally, the two magnetic films should be spaced apart by as small a distance as possible to provide the most effective magnetostatic coupling between the two films. That is, the conducting layer or, where employed, the combination of the conducting layer and the smoothing layer, should have as small a thickness as possible. In addition, the conducting layer should have a reasonably low resistivity (that is, a high conductivity) to enable use of low drive power levels (during "write" mode of operation) and to provide minimum attenuation of sense signals (during "read" mode of operation ). Further, the conducting layer should not be characterized by serious grain size and surface roughness problems necessitating a very thick smoothing layer to avoid degradation of the static magnetic properties of the upper magnetic film, particularly at relatively high deposition temperatures, e.g., 275°–350°C, as in the case of the deposition of certain magnetostrictive magnetic films. As a practical matter, and also from a cost standpoint, the materials from which the ideal magnetostatically coupled thin-film magnetic memory device is fabricated should be amenable to simple deposition and etching operations so as to be readily fabricated by batch-processing techniques, and the cost of the various materials employed should be reasonably low.

Although the devices suggested by the prior art, as discussed hereinabove, satisfy several of the above-stated requirements for an ideal magnetostatically coupled thin-film magnetic memory device, they do not satisfy all or most of the stated requirements. For example, when pure copper, silver, gold or aluminum is used as a conducting layer to separate the upper and lower magnetic films of a magnetostatically coupled thin-film device (no smoothing layer), rather severe grain growth takes place in the conducting layer during the formation of the upper magnetic film, particularly at higher temperatures (for example, 275°–350°C), causing the values of the static magnetic properties of the upper magnetic film to differ from normal desirable values and to differ, often significantly, from the values of the static magnetic properties of the lower magnetic film. When a smoothing layer, whether an insulating layer (such as silicon monoxide) or a refractory metal layer (such as molybdenum, titanium, or tungsten), has been used in conjunction with the pure metal conducting layer, the thickness of the smoothing layer required to achieve the desired or optimum values of static magnetic properties in the upper magnetic film has generally been quite great, and often much greater than the thickness of the conducting layer, thereby increasing the effective spacing between the two magnetic films and causing a loss of magnetostatic coupling between the two magnetic films. By way of example, when pure copper of a thickness of 2,000A is used as a conducting layer for separating magnetostrictive magnetic films having deposition temperatures of 275°–350 °C, and silicon monoxide is used as a smoothing layer, the silicon monoxide smoothing layer must have a thickness at least three times the thickness of the copper conducting layer to achieve satisfactory values of the static magnetic properties of the upper magnetic film.

As a partial solution to large-grain growth and surface roughness problems, it has been suggested to deposit the conducting layer (copper, for example) at very low temperatures, for example, −195°C, and to then deposit the smoothing layer (if any) and the upper magnetic film at the usual higher temperatures. This procedure is commonly referred to as "temperature cycling." However, temperature cycling introduces other problems in requiring the use of costly liquid nitrogen cooling equipment within the vacuum chamber of the film-deposition apparatus, an arrangement which is not readily accomplished.

In addition to the abovementioned problems, gold is relatively expensive and relatively difficult to etch, and molybdenum, titanium, and tungsten are relatively difficult to deposit. Aluminum, in addition to being the least desirable of the abovementioned pure metals for use as a conducting layer, because of its higher resistivity, does not lend itself to simple soldering operations as when it is desired to connect electrical leads thereto.

BRIEF SUMMARY OF THE INVENTION

Briefly, in accordance with the present invention, a multilayer magnetic thin-film device is provided in accordance with a first embodiment which satisfies most of the abovestated requirements for an ideal magnetic thin-film device and which overcomes most of the problems and difficulties associated with the prior art devices. Briefly, the multilayer magnetic thin-film device of the first embodiment includes a first, lower magnetic film, a second, upper magnetic film, and a chromium-copper alloy conducting layer and a smoothing layer between the first and second magnetic films. Because of the presence of chromium in the chromium-copper alloy conducting layer, the resulting grain growth and surface roughness produced in the chromium-copper alloy conducting layer during the subsequent formation of the upper magnetic film, as discussed previously, are less severe that with pure copper or other well known pure metals previously suggested for use as conducting layers in multilayer magnetic thin-film devices. Consequently, the effects of grain growth and surface roughness of the chromium-copper alloy conducting layer on the static magnetic properties of the upper magnetic film are less severe than heretofore, and a smaller combined thickness of the conducting layer and smoothing layer is required to make the values of the static magnetic properties of the upper and lower magnetic films more nearly equal. As a further result of the smaller combined thickness of the conducting and smoothing layers made possible by the use of chromium in the chromium-copper alloy, an improved magnetostatic coupling between the upper and lower magnetic films is obtained. In addition, the chromium in the chromium-copper alloy conducting layers, when present in small amounts, for example, about one-quarter of one percent by weight of the chromium-copper mixture from which the conducting layer is formed, results in an overall resistivity for the chromium-copper alloy conducting layer which is reasonably low and, therefore, acceptable for use in a multilayer magnetic thin-film device.

An alternative multilayer magnetic thin-film device having no smoothing layer is also provided in accordance with the invention for use in less stringent applications where very close matching of the values of the static magnetic properties of the upper and lower magnetic films is not required.

DETAILED DESCRIPTION OF THE INVENTION

Magnetostatically-coupled Thin-Film Magnetic Memory Device

Figure 1:
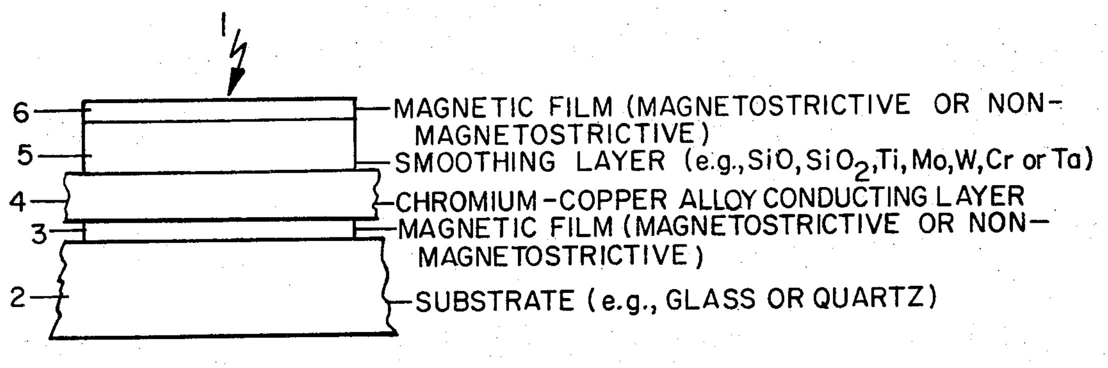
FIG. 1 is a side elevational view of a multilayer magnetostatically-coupled thin-film magnetic memory device disposed on a substrate in accordance with a first embodiment of the invention.

First Embodiment—FIG. 1

Referring to FIG. 1, there is shown in a side elevational view a multilayer magnetostatically coupled thin-film magnetic memory device 1 disposed on a substrate 2 in accordance with a first embodiment of the invention. As shown in FIG. 1, the multilayer magnetostatically coupled thin-film device 1 comprises, in succession, a first magnetic film 3, a chromium-copper alloy conducting layer 4, for example, a write-sense conducting layer, a smoothing layer 5, and a second magnetic film 6. Although not indicated in FIG. 1, an additional conducting layer may be provided above the second (upper) magnetic film and insulated therefrom for use as a half-select line in certain types of coincident-current memories, the other half-select line being the conducting layer 4. By way of examples of some materials which may be employed to fabricate the magnetostatically coupled thin-film memory device 1 of FIG. 1, in addition to the chromium-copper alloy conducting layer 4, the magnetic films 3 and 6 may be of a vacuum-deposited magnetostrictive or non-magnetostrictive Permalloy, Cobalt-Permalloy, or manganese-Permalloy material, and the smoothing layer 5 may be of vacuum-deposited silicon monoxide (SiO), silicon dioxide ($SiO_2$), molybdenum (Mo), tungsten (W), chromium (Cr), or tantalum (Ta). It is preferred, however, that the smoothing layer 5 be of silicon monoxide due to the relative ease with which such material is deposited. The substrate 2, on which the memory device 1 is formed, may be of glass or quartz.

A significant aspect of the present invention is the use of a chromium-copper alloy for forming the conducting layer 4. The basic problem in using pure copper (as well as other pure metals), as stated hereinabove, is the tendency of the pure copper to form large grains during the deposition of an upper magnetic film. More specifically, during the deposition of the upper magnetic film, the temperature of the pure copper conducting layer increases to the temperature of the upper magnetic film during the deposition thereof, large-grain growth takes place in the copper, and a surface roughness is produced in the copper which is directly proportional to the grain size of the copper. It is believed that the surface roughness of the pure copper conducting layer is caused by anisotropic growth rates in the copper in different crystallographic directions. The resulting effect of the large grain growth and surface roughness in the copper is to degrade the static magnetic properties of the upper magnetic film by increasing the values of these properties above normal values. As also discussed hereinbefore, even when a smoothing layer is employed to alleviate large-grain growth and surface roughness problems associated with the use of pure copper as a conducting layer, the thickness of the smoothing layer required to achieve the desired values of static magnetic properties in the upper magnetic film can be substantial, particularly in the case of certain magnetostrictive upper and lower magnetic films deposited at temperatures of approximately 275°–350°C, thereby leading to a loss in magnetostatic coupling between the two films because of the increased effective spacing therebetween.

In accordance with the present invention, a small amount of chromium is used together with copper to provide a chromium-copper melt mixture from which the chromium-copper alloy conducting layer is then formed. By way of example, the chromium-copper melt mixture may include about one-quarter of one percent by weight of chromium. The effect of the use of chromium as part of the chromium-copper alloy conducting layer is to reduce the grain growth and surface roughness in the chromium-copper alloy conducting layer by inhibiting large grain growth in the copper during the subsequent deposition of the upper magnetic film. As a consequence of using the chromium in the chromium-copper alloy conducting layer, it is possible to use an accompanying smoothing layer of a thickness less than (one-half, for example) to nearly equal the thickness of the chromium-copper alloy conducting layer for smoothing the chromium-copper alloy conducting layer and for achieving the normal values of static magnetic properties in the upper magnetic film. It is to be noted that while the presence of one-fourth percent chromium by weight of the chromium-copper melt mixture from which the chromium-copper alloy conducting layer is formed results in an increase in the resistivity of pure copper by approximately 50 percent, from approximately $1.7 \times 10^{-6}$ohm-cm to approximately $2.5 \times 10^{-6}$ohm-cm, this increase in resistivity is considered an acceptable increase, the resultant resistivity being less than pure aluminum and approximately equal to pure gold, for example, It is also contemplated in accordance with the present invention that more or less chromium may be used. For example, as little as one-tenth of one percent of chromium (by weight) may be used in a chromium-copper melt mixture and still inhibit grain growth effectively. For short write-sense conducting layers (e.g., less than 1 foot), as much as one-half of one percent chromium (by weight) may be used in a chromium-copper melt mixture.

A highly satisfactory magnetostatically-coupled thin-film magnetic memory device such as shown in FIG. 1 was constructed in the following manner. A magnetostrictive Permalloy material, 60% Ni/40% Fe, was vacuum deposited onto a glass substrate, at a temperature of approximately 280°C, to a thickness of 1,000 A to produce the lower magnetic film. The composition of the deposited lower magnetic film was 45% Ni/55% Fe. A chromium-copper alloy conducting layer was then vacuum-deposited onto the lower magnetic film from a chromium-copper melt mixture containing one-fourth percent chromium by weight to a thickness of 3,000A. The temperature of the assembly during the deposition of the chromium-copper conducting layer was 100°C. A silicon monoxide smoothing layer was then vacuum-deposited onto the chromium-copper alloy conducting layer to a thickness of 2,500A. The temperature of the assembly during the deposition of the silicon monoxide smoothing layer was 200°C. A second magnetic film was then formed, on the silicon monoxide smoothing layer, to a thickness of 1,000A by vacuum-depositing magnetostrictive Permalloy material, also 60% Ni/40% Fe, at an assembly temperature of approximately 280°C. The composition of the deposited second magnetic film was 45% Ni/55% Fe. With the above materials and values, the wall-motion coercive force $H_c$ of the second (upper) magnetic film was 5.5 Oersteds, the angular dispersion $\alpha_{90}$ was 2.5°, and the anisotropy field $H_k$ was 8 Oersteds, these values consitituting normal, desirable values. The corresponding values of $H_c$, $\alpha_{90}$, and $H_k$ for the first (lower) magnetic film were 5 Oersteds, 2°, and 8 Oersteds, respectively. As is evident from the above example, the static magnetic properties of the upper and lower magnetic films were nearly the same while at the same time the spacing between the two magnetic films was maintained at a relatively small value (5,500A) thereby insuring effective magnetostatic coupling between the two magnetic films.

Many variations are possible in the above described specific example. For example, the upper and lower magnetostrictive Permalloy magnetic films may each have a thickness of 500–2,000A and be vacuum-deposited at a temperature of 275°–350°C. The thickness of the chromium-copper alloy conducting layer may vary from a minimum of 3,000A to a maximum of 2 microns (20,000A), and the thickness of the accompanying silicon monoxide smoothing layer may vary from a minimum of 1,500A (corresponding to a 3,000A chromium-copper alloy conducting layer) to a maximum of 1.5 microns (corresponding to a 2 micron chromium-copper alloy conducting layer). The temperature of the assembly during the deposition of the chromium-copper alloy conducting layer or the silicon monoxide smoothing layer may be 100°–200°C. As to the use of pure copper as a conducting layer, experimentation has indicated that a pure copper conducting layer having a thickness of 2 microns, when used with certain magnetostrictive Permalloy upper and lower magnetic films (e.g., 60% Ni/40% Fe) deposited at 275°–350°C, cannot be smoothed by any reasonable layer of silicon monoxide to produce a good quality upper magnetic film.

In addition to the abovedescribed specific example, it is possible to fabricate a multilayer device similar in all respects to the device of the above specific example with the exception of using non-magnetostrictive magnetic films instead of the magnetostrictive magnetic films and using a temperature during deposition of 200°–325°C. A suitable non-magnetostrictive material is an 80% Ni/20% Fe Permalloy material. It may also be possible in this case to use a smoothing layer of a thickness less than that given above due to the less sever grain growth resulting from the use of lower temperatures during deposition.

Figure 2:
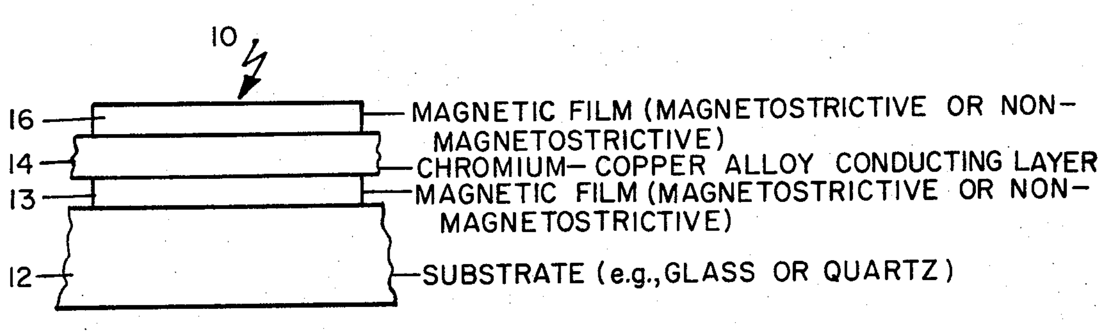
FIG. 2 is a side elevational view of a multilayer magnetostatically coupled thin-film magnetic memory device disposed on a substrate in accordance with an alternative embodiment of the invention.

Magnetostatically-Coupled Thin-Film Magnetic Memory Device Thin-film Magnetic Memory Device Alternative Embodiment—FIG. 2

Referring now to FIG. 2, there is shown in a side elevational view a multilayer magnetostatically coupled thin-film magnetic memory device 10 deposed on a substrate 12 in accordance with an alternative embodiment of the invention. As shown in FIG. 2, the multilayer magnetostatically coupled thin-film device 10 comprises, in succession, a first magnetic film 13, a chromium-copper alloy conducting layer 14, for example, a write-sense conducting layer, and a second magnetic film 16. As in the case of the multilayer memory device 1 of FIG. 1, the magnetic films 13 and 16 may be of a vacuum-deposited magnetostrictive or non-magnetostrictive Permalloy, Cobalt-Permalloy, or manganese-Permalloy material. The substrate 12 may be of glass or quartz. It is apparent therefore, that the multilayer memory device 10 of FIG. 2 is similar to the multilayer memory device 1 of FIG. 1 with the exception that no smoothing layer is used in the multilayer memory device 10 of FIG. 2. The particular multilayer memory device 10 of FIG. 2 may be employed in applications where some differences in the values of the static magnetic properties of the upper and lower magnetic films, due to grain growth in the chromium-copper alloy conducting layer, can be tolerated, for example, in short strip-line memory applications.

A reasonably satisfactory magnetostatically coupled thin-film magnetic memory device such as shown in FIG. 2 was constructed in the following manner. A magnetostrictive Permalloy material, 60% Ni/40% Fe, was vacuum-deposited onto a glass substrate, at a temperature of approximately 280°C, to a thickness of 2,000A to produce the lower magnetic film. The composition of the deposited lower magnetic film was 45% Ni/55% Fe. A chromium-copper alloy conducting layer was then vacuum-deposited onto the lower magnetic film, from a chromium-copper melt mixture, containing one-fourth percent percent chromium by weight to a thickness of 3,000A. The temperature of the assembly during the deposition of the chromium-copper alloy conducting layer was 100°C. A second magnetic film was then formed, on the chromium-copper alloy conducting layer, to a thickness of 2,000A by vacuum-depositing magnetostrictive Permalloy material, again 60% Ni/40% Fe, at an assembly temperature of approximately 280°C. The composition of the deposited second magnetic film was 45% Ni/ 55% Fe. With the above materials and values, the wall-motion coercive force $H_c$ of the second (upper) magnetic film was 6 Oersteds, the angular dispersion $\alpha_{90}$ was 4°, and the anisotropy field $H_k$ was 7 Oersteds. The corresponding values of $H_c$, $\alpha_{90}$, and $H_k$ for the first (lower) magnetic film were 5 Oersteds, 2°, and 8 Oersteds, respectively. As is evident from the above example, the values of the static magnetic properties of the upper and lower magnetic films differed from each other. However, experimentation has indicated that the differences are less than if a pure copper conducting layer were used and, hence, the resulting device is considered more satisfactory for use as a magnetostatically coupled thin-film magnetic memory device.

Many variations are also possible in the abovedescribed specific example. However, inasmuch as these variations are of the same nature as discussed hereinabove in connection with the first specific example, it is not believed that further discussion is necessary here.

What is claimed is:

1. A multilayer magnetic thin-film device including:
a first magnetic film;
a second magnetic film; and
a chromium-copper alloy conducting layer and a smoothing layer between the first and second magnetic films, said smoothing layer directly contacting the chromium-copper alloy conducting layer and the second magnetic film and smoothing the surface of the chromium-copper alloy conducting layer in contact therewith.

2. A multilayer magnetic thin-film device in accordance with claim 1 wherein:
the chromium-copper alloy conducting layer is formed from a chromium-copper mixture containing one-tenth to one-half of one percent chromium by weight.

3. A multilayer magnetic thin-film device in accordance with claim 1 wherein:
the chromium-copper alloy conducting layer is formed from a chromium-copper mixture containing about one-quarter of one percent chromium by weight.

4. A multilayer magnetic thin-film device in accordance with claim 3 wherein:
the first and second magnetic films are nickel-iron alloy films.

5. A multilayer magnetic thin-film device in accordance with claim 3 wherein:
the first and second magnetic films are Cobalt-nickel-iron alloy films.

6. A multilayer magnetic thin-film device in accordance with claim 3 wherein:
the first and second magnetic films are manganese-nickel-iron alloy films.

7. A multilayer magnetic thin-film device in accordance with claim 4 wherein:
the smoothing layer is a silicon monoxide layer.

8. A multilayer magnetic thin-film device in accordance with claim 4 wherein:
the first and second magnetic films are non-magnetostrictive nickel-iron alloy films.

9. A multilayer magnetic thin-film device in accordance with claim 7 wherein:
the first and second magnetic films are magnetostrictive nickel-iron alloy films.

10. A magnetostatically coupled thin-film magnetic memory device including:
a first nickel-iron alloy magnetic storage film having a thickness of 500–2,000A;
a chromium-copper alloy write-sense conducting layer disposed on the first nickel-iron alloy magnetic storage film and having a thickness of 3,000A to 2 microns, said chromium-copper alloy write-sense conducting layer being formed from a chromium-copper mixture containing from one-tenth to one-half of one percent of chromium by weight;
a silicon monoxide smoothing layer directly contacting the chromium-copper alloy write-sense conducting layer to smooth the surface of the chromium-copper alloy conducting layer in contact therewith and having a thickness of 1,500A to 1.5 microns; and
a second nickel-iron alloy magnetic storage film directly contacting the silicon monoxide smoothing layer and having a thickness of 500–2,000A.

11. A magnetostatically coupled thin-film magnetic memory device in accordance with claim 10 wherein:
the first and second nickel-iron alloy magnetic storage films are both magnetostrictive.

12. A multilayer magnetic thin-film device including:
a first magnetic film;
a second magnetic film; and
a chromium-copper alloy conducting layer between the first and second magnetic films, said chromium-copper alloy conducting layer directly contacting the second magnetic film.

13. A multilayer magnetic thin-film device in accordance with claim 12 wherein:

the chromium-copper alloy conducting layer is formed from a chromium-copper mixture containing one-tenth to one-half of one percent chromium by weight.

14. A multilayer magnetic thin-film device in accordance with claim 12 wherein:

the chromium-copper alloy conducting layer is formed from a chromium-copper mixture containing about one-quarter of one percent chromium by weight.

15. A multilayer magnetic thin-film device in accordance with claim 14 wherein:

the first and second magnetic films are nickel-iron alloy films.

16. A multilayer magnetic thin-film device in accordance with claim 14 wherein:

the first and second magnetic films are cobalt-nickel-iron alloy films.

17. A multilayer magnetic thin-film device in accordance with claim 14 wherein:

the first and second magnetic films are manganese-nickel-iron alloy films.

18. A multilayer magnetic thin-film device in accordance with claim 15 wherein:

the first and second magnetic films are non-magnetostrictive nickel-iron alloy films.

19. A multilayer magnetic thin-film device in accordance with claim 15 wherein:

the first and second magnetic films are magnetostrictive nickel-iron alloy films.

20. A magnetostatically coupled thin-film magnetic memory device including:

a first magnetostrictive nickel-iron alloy magnetic storage film having a thickness of 2,000A;

a chromium-copper alloy write-sense conducting layer directly contacting the first magnetostrictive nickel-iron alloy magnetic storage film and having a thickness of 3,000A, said chromium-copper alloy write-sense conducting layer being formed from a chromium-copper mixture containing from one-tenth to one-half of one percent of chromium by weight; and a second magnetostrictive nickel-iron alloy magnetic storage film having a thickness of 2,000A, said chromium-copper alloy conducting layer directly contacting said second magnetic film.

* * * * *